US008912900B2

(12) United States Patent
Toda

(10) Patent No.: US 8,912,900 B2
(45) Date of Patent: Dec. 16, 2014

(54) INFORMATION ACQUISITION DEVICE, POSITIONAL INFORMATION STORAGE METHOD AND STORAGE MEDIUM

(75) Inventor: Naoto Toda, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 627 days.

(21) Appl. No.: 12/963,892

(22) Filed: Dec. 9, 2010

(65) Prior Publication Data

US 2011/0156900 A1 Jun. 30, 2011

(30) Foreign Application Priority Data

Dec. 25, 2009 (JP) ................................ 2009-293876

(51) Int. Cl.
*G08B 1/08* (2006.01)
*H04N 21/4223* (2011.01)
(Continued)

(52) U.S. Cl.
CPC ........... *H04N 5/772* (2013.01); *H04N 21/4223* (2013.01); *H04N 21/41407* (2013.01); *H04N 21/4436* (2013.01); *H04N 9/8205* (2013.01); *H04N 21/42202* (2013.01); *H04N 21/8153* (2013.01)
USPC .................. 340/539.13; 340/531; 340/539.1; 340/539.11; 340/539.2; 701/408; 701/468; 701/532; 342/357.21; 342/357.24; 342/357.25

(58) Field of Classification Search
USPC ............ 340/500, 531, 539.1, 539.11, 539.13, 340/539.2; 386/E5.002, E5.012, E5.02, 386/E5.025; 348/47, 143; 707/E17.026, 707/E17.029, E17.031; 701/300–302, 400, 701/408, 468–491, 516, 517, 532; 455/456.1–457; 342/357.21, 357.24, 342/357.25; 702/127, 150
See application file for complete search history.

(56) References Cited

U.S. PATENT DOCUMENTS 7,869,950 B2 1/2011 Ueda et al.
2002/0126913 A1* 9/2002 Kotake et al. ................. 382/282
(Continued)

FOREIGN PATENT DOCUMENTS

JP 2006-339723 A 12/2006
JP 2007-158886 A 6/2007
(Continued)

OTHER PUBLICATIONS

Machine Translation of Japanese Publication JP 2006-339723 of Matsubara, Publication Date Dec. 14, 2006.*
(Continued)

*Primary Examiner* — Steven Lim
*Assistant Examiner* — Sisay Yacob
(74) *Attorney, Agent, or Firm* — Holtz, Holtz, Goodman & Chick PC

(57) ABSTRACT

An information acquisition device, includes: a positioning unit that measures a current position and acquires positional information thereof; an information acquisition unit that acquires information; a storage unit that stores information acquired by the information acquisition unit and positional information acquired by the positioning unit; and a control unit that causes the positioning unit to perform positioning, while the information acquisition unit is activated, at an interval shorter than while the information acquisition unit is stopped, and causes positional information acquired while the information acquisition unit is activated, outside a time period determined in advance with a time in which acquisition of information was performed by the information acquisition unit as a reference point, among positional information acquired in the positioning unit, to be thinned and stored in the storage unit.

9 Claims, 9 Drawing Sheets

(51) Int. Cl.
*H04N 21/414* (2011.01)
*H04N 21/443* (2011.01)
*H04N 5/77* (2006.01)
*H04N 9/82* (2006.01)
*H04N 21/422* (2011.01)
*H04N 21/81* (2011.01)

(56) References Cited

U.S. PATENT DOCUMENTS

2002/0154213 A1* 10/2002 Sibyama et al. ............... 348/47
2003/0074130 A1* 4/2003 Negishi et al. ............... 701/200
2007/0237086 A1* 10/2007 Tulac et al. .................. 370/244
2007/0263981 A1* 11/2007 Ueno et al. ................... 386/83

FOREIGN PATENT DOCUMENTS

JP 2007-218865 A 8/2007
JP 2007-221696 A 8/2007

OTHER PUBLICATIONS

Japanese Office Action dated Dec. 20, 2011 (and English translation thereof) in counterpart Japanese Application No. 2009-293876.
Korean Office Action dated Feb. 14, 2012 (and English translation thereof) in counterpart Korean Application No. 10-2010-0134125.

* cited by examiner

| No. | TIME DATA | POSITIONAL DATA | IMAGING TIMING FLAG |
|-----|-----------|-----------------|---------------------|
| 1 | ::** | X:341.0 , Y:141.0 | |
| 2 | ::** | X:340.8 , Y:141.0 | |
| 3 | ::** | X:340.6 , Y:141.0 | 1 |
| ⋮ | ⋮ | ⋮ | ⋮ |
| N-1 | ::** | X:279.8 , Y:179.8 | 1 |
| N | ::** | X:280.0 , Y:180.0 | |

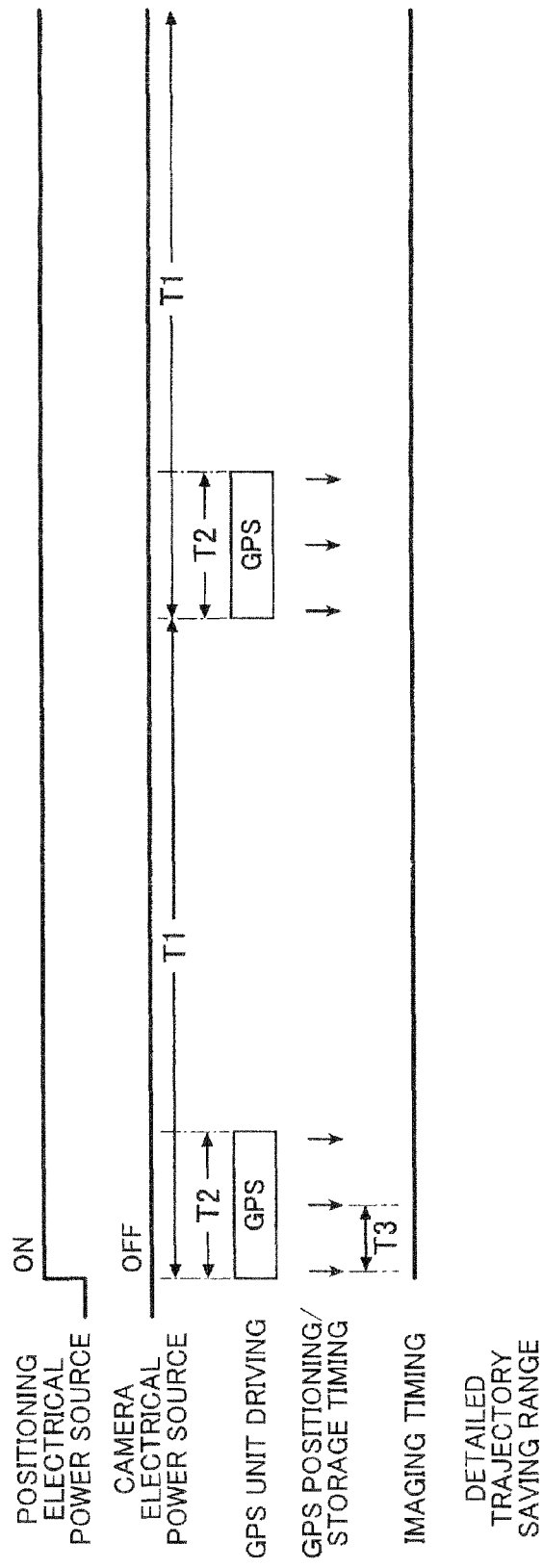

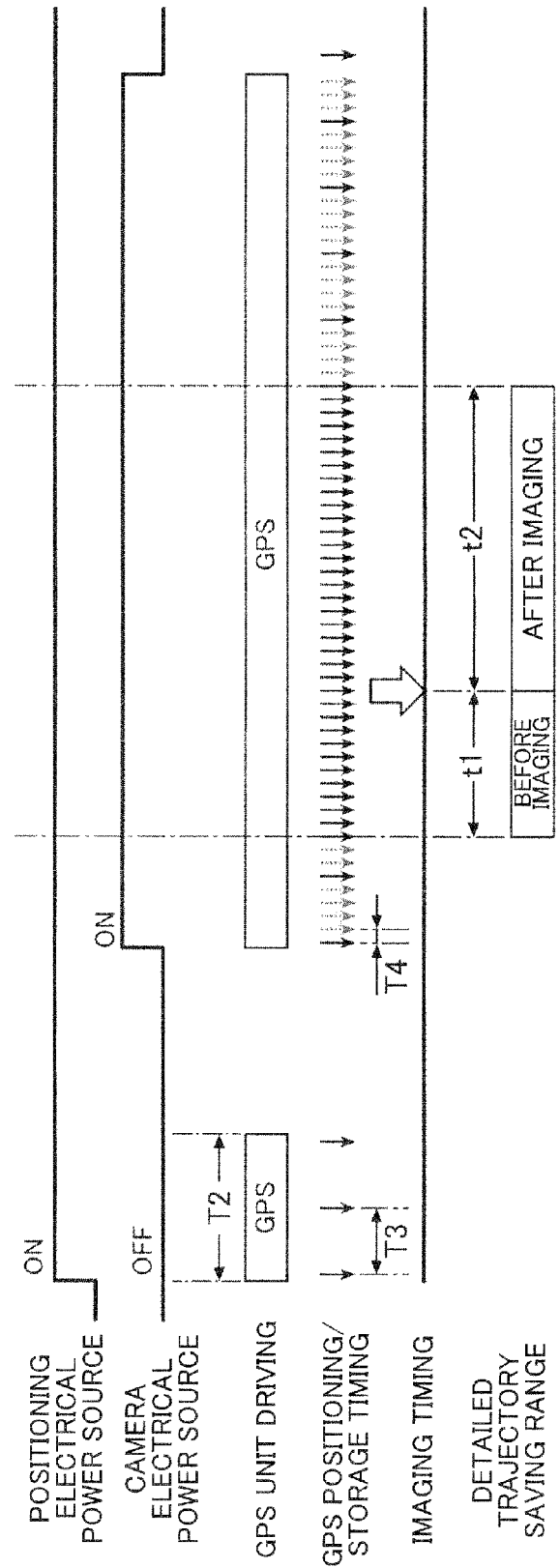

FIG. 6
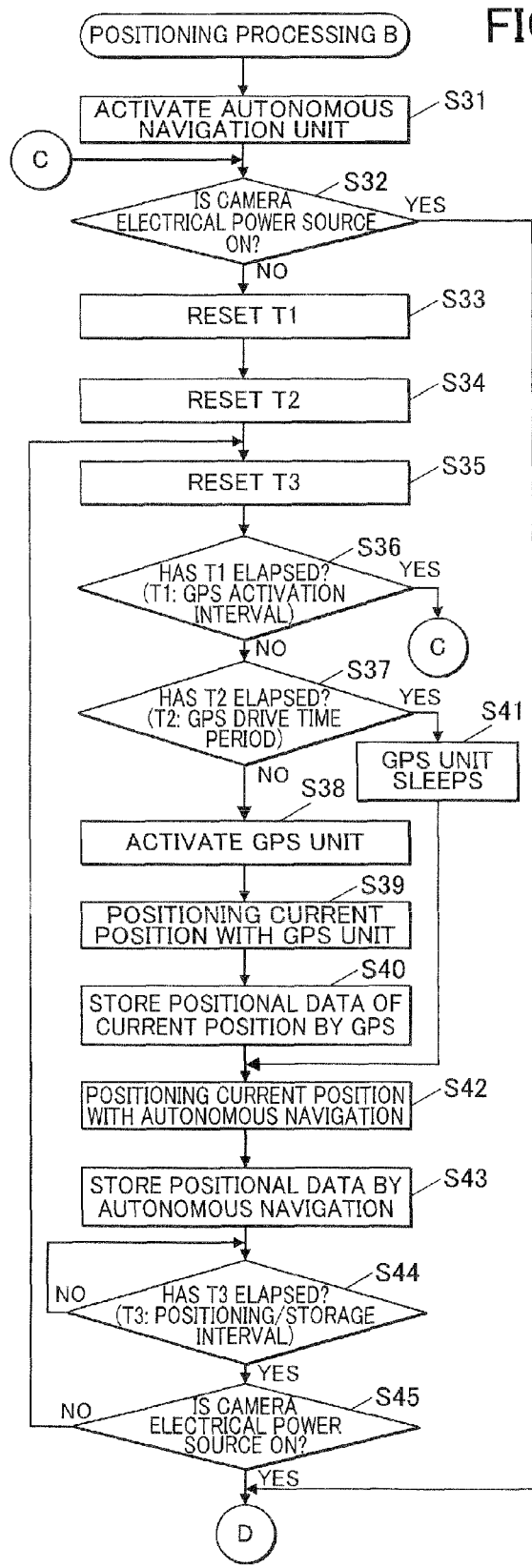
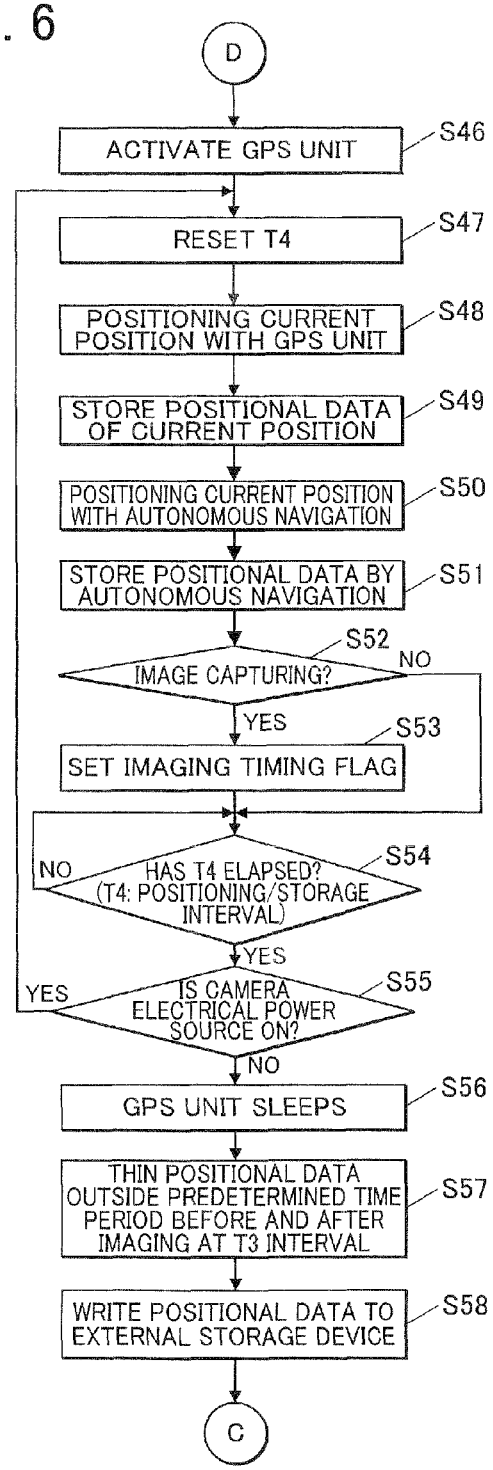

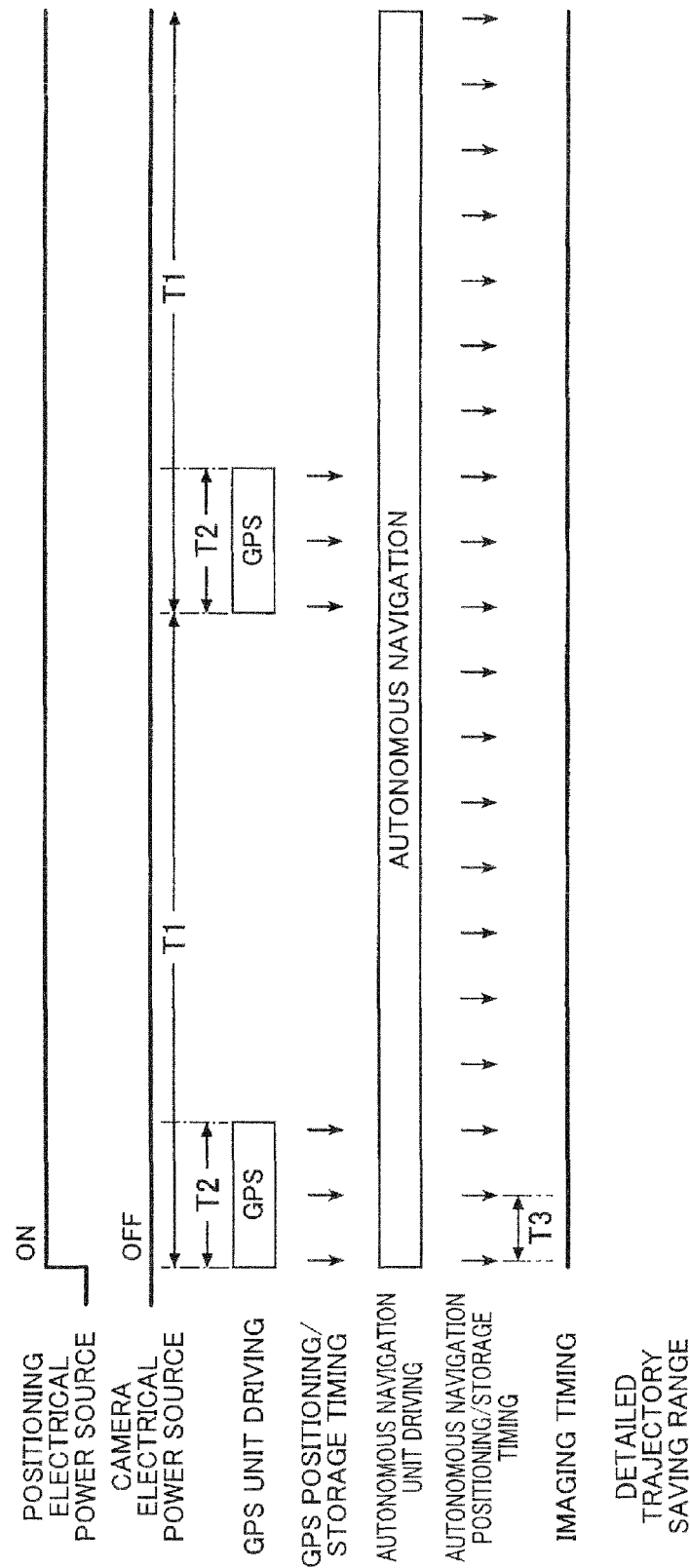

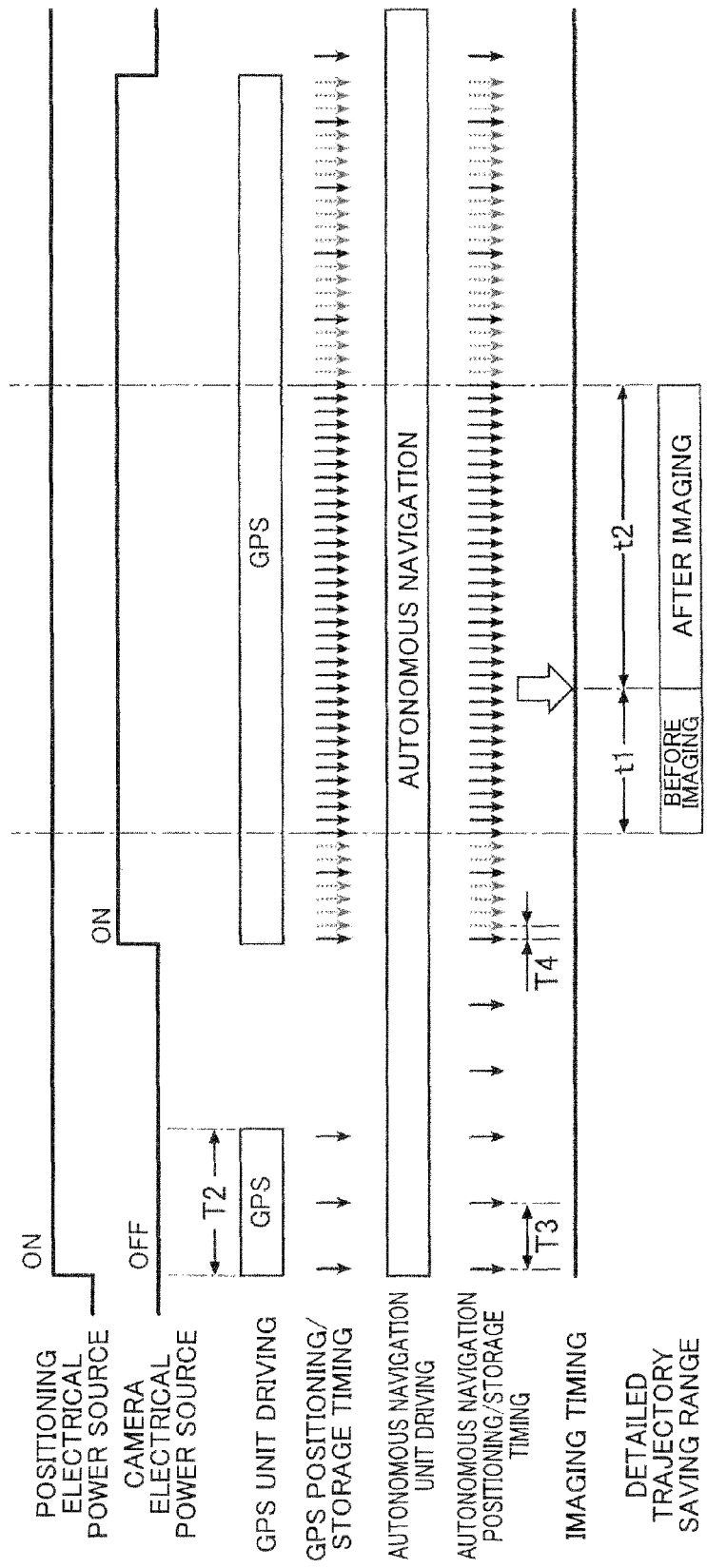

INFORMATION ACQUISITION DEVICE, POSITIONAL INFORMATION STORAGE METHOD AND STORAGE MEDIUM

CROSS REFERENCE TO RELATED APPLICATIONS

This application claims benefit of Japanese Patent Applications No. 2009-293876 filed on Dec. 25, 2009, the entire contents of which are incorporated herein by reference.

BACKGROUND OF THE INVENTION

1. Field of the Invention

The present invention relates to an information acquisition device, positional information storage method and storage medium.

2. Related Art

Conventionally, there is an imaging device such as a digital camera having a positioning function by GPS (Global Positioning System). Such an imaging device can record positional information of photographing places and records a movement trajectory of a user as attribute information of photographing data.

In general, a device provided with a GPS unit that performs positioning by way of GPS, always supplies electrical power to the GPS unit, and continuously receives and analyzes signals from satellites while the device is being used. However, for the device that employs a battery as the electrical power supply source such as an imaging device, continuously supplying electrical power to the GPS unit leads to quick draining of the battery.

In light of this fact, Japanese Unexamined Patent Application Publication No. 2007-158886 discloses an imaging device that measures a frequency of photographing by a user, and causes the operating state of a GPS device to transition based on the measured photographing frequency, for example.

Further, an information acquisition device such as an imaging device that acquires image information and a voice recorder that acquires sound information, acquires data of positional information supplied from a GPS unit or the like as a movement trajectory of the user. Consequently, if the data volume is large, an external storage device having a large storage capacity must be provided. Then, a problem is encountered in that the information acquisition device requires a great deal of electric power and processing time as a result thereof. On the other hand, if the acquisition of positional information is made sparse having regard to electric power consumption of the information acquisition device, the user will be unable to know in detail a movement trajectory to a place of interest, such as in a vicinity of where the user has performed photographing (image capturing by the camera).

It is an object of the present invention to make it possible for an information acquisition device such as an imaging device to allow a user to know in detail a movement trajectory in the vicinity of a place at which information acquisition has been performed while suppressing electrical power consumption.

SUMMARY OF THE INVENTION

In order to achieve the above-mentioned object, in accordance with one aspect of the present invention, there is provided an information acquisition device, including: a positioning unit for measuring a current position and acquiring positional information thereof; an information acquisition unit that acquires information; a storage unit that stores information acquired by the information acquisition unit and positional information acquired by the positioning unit; and a control unit that causes the positioning unit to perform positioning at a predetermined interval while the information acquisition unit is activated, and causes positional information acquired, outside a time period determined in advance with a time in which acquisition of information was performed by the information acquisition unit as a reference point, to be thinned and stored in the storage unit.

In order to achieve the above-mentioned object, in accordance with one aspect of the present invention, there is provided a positional information storage method of an imaging device that includes a positioning unit that measures a current position and acquiring positional information thereof, an information acquisition unit that acquires information, and a storage unit that stores information acquired by the information acquisition unit and positional information acquired by the positioning unit, including steps of: causing the positioning unit to perform positioning while the information acquisition unit is activated; causing positional information acquired, outside a time period determined in advance with a time in which acquisition of information was performed by the information acquisition unit as a reference point, to be thinned and stored in the storage unit.

In order to achieve the above-mentioned object, in accordance with one aspect of the present invention, there is provided a storage medium having stored therein a program executable by a computer used for information acquisition device that includes a positioning unit that measures a current position and acquires positional information thereof, an information acquisition unit that acquires information, and a storage unit that stores information acquired by the information acquisition unit and positional information acquired by the positioning unit, to function as a control unit that causes the positioning unit to perform positioning at a predetermined interval, while the information acquisition unit is activated, and causes positional information acquired, outside a time period determined in advance with a time in which acquisition of information was performed by the information acquisition unit as a reference point, to be thinned and stored in the storage unit.

BRIEF DESCRIPTION OF THE DRAWINGS

FIG. 2 is a chart showing an example of data storage in a movement trajectory storage region of FIG. 1;

FIG. 4A is a time chart showing relationships between ON/OFF states of a positioning electrical power source and a camera electrical power source, imaging timing, and a drive time period of GPS and a timing of GPS positioning and storage for a case of performing the positioning processing A shown in FIG. 3 while the positioning electrical power source is ON;

FIG. 4B is a time chart showing relationships between ON/OFF states of the positioning electrical power source and camera electrical power source, the imaging timing, and the drive time period of GPS and a timing of GPS positioning and storage for a case of performing the positioning processing A shown in FIG. 3 when the positioning electrical power source is ON;

FIG. 6 is a flowchart showing positioning processing B that is executed by the GPS in FIG. 5;

FIG. 7A is a flowchart showing relationships between ON/OFF states of the positioning electrical power source and camera electrical power source, the imaging timing, the drive time period of GPS and a timing of GPS positioning and storage, and the drive time period of autonomous navigation and a timing of positioning and storage for a case of performing the above-mentioned positioning processing B when the positioning electrical power source is ON; and FIG. 7B is a flowchart showing relationships between ON/OFF states of the positioning electrical power source and camera electrical power source, the imaging timing, the drive time period of GPS and a timing of GPS positioning and storage, and the drive time period of autonomous navigation and a timing of positioning and storage for a case of performing the above-mentioned positioning processing B when the positioning electrical power source is ON.

DETAILED DESCRIPTION OF THE INVENTION

Hereinafter, preferred embodiments according to the present invention will be explained in detail while referring to the appended drawings. It should be noted that the present invention is not to be limited to the illustrated examples.

[First Embodiment]

Figure 1:
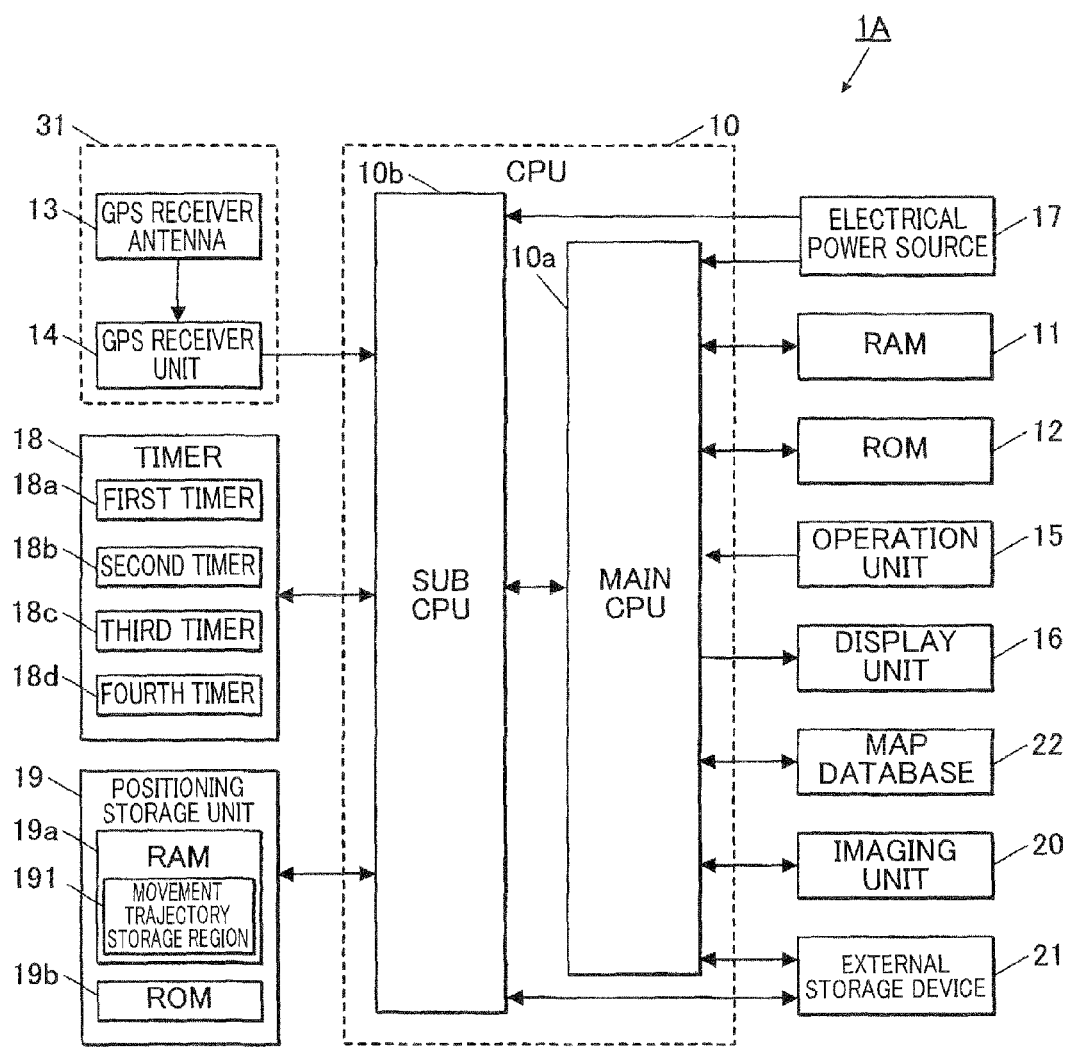
FIG. 1 is a block diagram showing a functional configuration of an imaging device according to a first embodiment.

FIG. 1 is a block diagram showing a functional configuration of an imaging device 1A as an information acquisition device according to a first embodiment.

The imaging device 1A is carried by a user, and has a positioning function of measuring the current position of the user. The imaging device 1 includes a CPU (Central Processing Unit) 10, RAM (Random Access Memory) 11, ROM (Read Only Memory) 12, a GPS receiver antenna 13 and a GPS receiver unit 14, an operation unit 15, a display unit 16, an electrical power source 17, a timer 18, a positioning storage unit 19, an imaging unit 20, an external storage device 21, and a map database 22, as shown in FIG. 1.

The CPU 10 includes a main CPU 10a and a sub CPU 10b. The main CPU 10a performs control relating to camera (image capturing) functions of the imaging device 1A and the user interface. The main CPU 10a expands programs stored in the ROM 12 in the RAM 11, and executes every processing relating to camera functions in cooperation with the programs expanded in the RAM 11. The sub CPU 10b performs control relating to the positioning functions of the imaging device 1A. The sub CPU 10b expands programs stored in ROM 19b of the positioning storage unit 19 in RAM 19a of the positioning storage unit 19. Then, the sub CPU 10b executes the positioning processing A described later and the like in cooperation with the program expanded in the RAM 19a, and performs control relating to positioning functions.

The RAM 11 provides memory space for operations of the main CPU 10a. The ROM 12 stores programs executable by the CPU 10a and data required in the execution of the programs.

The GPS receiver antenna 13 receives signals transmitted from GPS (Global Positioning System) satellites. The GPS receiver unit 14 acquires various transmitted data of GPS satellites by performing demodulation processing of signals received via the GPS receiver antenna 13 based on operational commands from the sub CPU 10b. In addition, the GPS receiver unit 14 can acquire data of positional information (positional data) representing the current position as a positioning result, by performing predetermined positioning computing based on this transmitted data of GPS satellites.

The GPS receiver antenna 13 and the GPS receiver unit 14 constitute a GPS unit 31 as a positioning unit that measures the current position.

The display unit 16 is constituted by an LCD (Liquid Crystal Display) and the like. The display unit 16 performs various information display and image display based on display instructions from the main CPU 10a. The operation unit 15 includes various function buttons including a shutter button that instructs to capture an image. The operation unit 15 outputs operation signals to the main CPU 10a in response to a button operation by the user.

The electrical power source 17 is constituted by a battery and the like, and is connected to a camera electrical power source switch and a positioning electrical power source switch, which are not illustrated. The electrical power source 17 supplies operating voltage to the main CPU 10a as well as supplying operating voltage to each unit connected to the main CPU 10a based on instructions of the main CPU 10a, when the camera electrical power source switch is turned ON. In addition, the electrical power source 17 supplies operating voltage to the sub CPU 10b as well as supplying operating voltage to each unit connected to the sub CPU 10b based on instructions of the sub CPU 10b, when the positioning electrical power source switch is turned ON.

The timer 18 is constituted by a first timer 18a, a second timer 18b, a third timer 18c, and a fourth timer 18d. The first timer 18a is a timer for measuring an activation interval T1 of the GPS unit 31. The second timer 18b is a timer for measuring a drive time period T2 of the GPS unit 31. The third timer 18c is a timer for measuring an interval T3 for positioning by the GPS, and storing positional data thus positioned while the camera electrical power source is OFF. The fourth timer 18d is a timer for measuring an interval T4 for positioning by the GPS, and storing positional data thus positioned while the camera electrical power source is ON. It should be noted that the relationship T1>T2>T3>T4 is defined here.

The positioning storage unit 19 includes the RAM 19a and the ROM 19b. The RAM 19a provides memory space for operations of the sub CPU 10b. In addition, the RAM 19a has a movement trajectory storage region 191. As shown in FIG. 2, the movement trajectory storage region 191 has stored therein index numbers "No." representing the acquisition order of the positional data, time data representing the time when positional data was acquired, an imaging timing flag indicating whether positional data is acquired at the imaging timing, respectively, in association with corresponding positional data. The ROM 19b stores programs executable by the sub CPU 10b and data required in the execution of programs.

The imaging unit 20 includes an imaging lens, a photoelectric conversion element such as a CCD (Charge Coupled Device), CMOS (Complementary Metal-oxide Semiconductor, or the like, an A/D conversion unit, and the like. The imaging unit 20 converts an optical image introduced by the imaging lens to an image signal by the photoelectric conversion element. The imaging unit 20 converts this image signal to digital image information (image data) by the A/D conversion unit, and generates image data.

The external storage device 21 is constituted by removable memory such as a CF (Compact Flash) card, SD card, and USB memory and an interface for performing data input/output with these types of memory. The external storage device 21 stores image data and positional data according to instructions from the main CPU 10a.

The map database 22 stores map data for displaying maps on the display unit 16.

Figure 3:
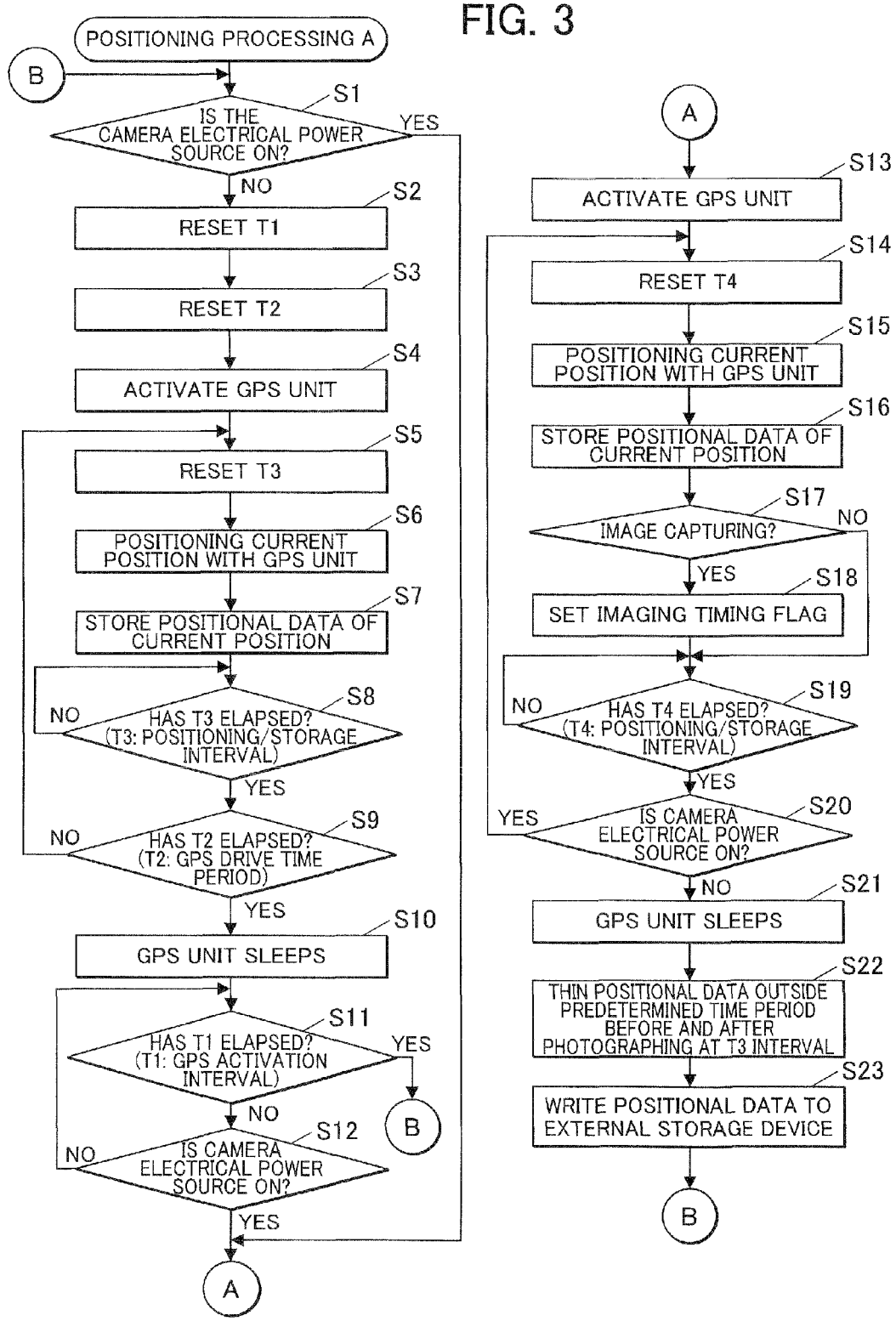
FIG. 3 is a flowchart showing positioning processing A that is executed by the CPU of FIG. 1.

Next, the positioning processing A that is executed in the sub CPU 10 of the imaging device 1A with the above-mentioned constitution will be explained. FIG. 3 is a flowchart showing the positioning processing A. The positioning processing A is initiated when the positioning electrical power source switch is turned ON, and is executed in cooperation with the sub CPU 10*b* and the programs stored in the ROM 19*b*. It should be noted that the processing of each step from Step S1 to Step S21 is executed at an extremely high speed, and does not particularly affect measurement of the times T1, T2, T3 and T4.

The positioning processing A first determines whether or not the camera electrical power source is ON (Step S1). More specifically, when the camera electrical power source switch is turned on, operating voltage is supplied to the CPU 10*a* from the electrical power source 17, and communication between the main CPU 10*a* and the sub CPU 10*b* becomes possible. The sub CPU 10*b* determines whether or not the camera electrical power source is ON based on whether or not communication with the main CPU 10*a* is possible. It should be noted that, when the camera electrical power source is turned ON, operating voltage is supplied to each unit connected to the main CPU 10*a*, including the imaging unit 20, and each unit is activated.

In Step S1, in a case of having determined that the camera electrical power source is not ON (Step S1: NO), the sub CPU 10*b* resets the first timer 18*a* to T1, and causes the first timer 18*a* to initiate measurement of T1 (Step S2).

Next, the sub CPU 10*b* resets the second timer 18*b* to T2, and causes the second timer 18*b* to initiate measurement of T2. Then, the sub CPU 10*b* supplies operating voltage to the GPS unit 31 from the electrical power source 17, and causes the GPS unit 31 to activate (Step S4).

Next, the sub CPU 10*b* resets the third timer 18C to T3, and causes the third timer 18C to initiate measurement of T3 (Step S5). Then, the sub CPU 10*b* outputs a command to instruct positioning to the GPS receiver unit 14, and causes the GPS receiver unit 14 to conduct GPS positioning (Step S6). In other words, the GPS receiver unit 14 acquires various transmitted data of GPS satellites by the demodulation processing being performed on signals received via the GPS receiver antenna 13 from the GPS satellites. Then, the GPS receiver unit 14 acquires positional data representing the current position by performing predetermined positioning computing based on the transmitted data thus acquired. The positional data thus acquired is stored in association with an index number and current time data in the movement trajectory storage region 191 of the RAM 19*a* (Step S7).

When GPS positioning ends, the sub CPU 10*b* causes the GPS receiver unit 14 to be in a standby state until the elapse of T3 is measured by the third timer 18*c*. When the sub CPU 10*b* determines that T3 has elapsed, and a timing of subsequent GPS positioning and storing positional data thereof has arrived (Step S8: YES), the sub CPU 10*b* determines whether or not the elapse of T2 is measured by the second timer 18*b* (Step S9). In a case of having determined that the elapse of T2 is not measured by the second timer 18*b*, the sub CPU 10*b* causes the processing to return to Step S5.

On the other hand, in a case of having determined that the elapse of T2 is measured by the second timer 18*b* (Step S9: YES), the sub CPU 10*b* stops the electrical power supply to the GPS unit 31 from the electrical power source 17. As a result thereof, the GPS unit 31 enters a sleep state (Step S10). Next, the sub CPU 10*b* determines whether or not the elapse of T1 is measured by the first timer 18*a*, and a timing of subsequent activation of GPS has arrived. In a case of having determined that T1 has elapsed (Step S11: YES), the sub CPU 10*b* causes the processing to return to Step S1. In a case of having determined that the elapse of T1 is not measured by the first timer 18*a* (Step S11: NO), the sub CPU 10*b* determines whether or not the camera electrical power source is ON (Step S12). In a case of having determined that the camera electrical power source is not ON (Step S12: NO), the sub CPU 10*b* causes the processing to return to Step S11. In a case of having determined that the camera electrical power source is ON (Step S12: YES), the sub CPU 10*b* causes the processing to advance to Step S13.

On the other hand, in a case of having determined that the camera electrical power source is ON in Step S1 (Step S1: YES), the sub CPU 10*b* causes the processing to advance to Step S13.

In Step S13, the sub CPU 10*b* supplies operating voltage to the GPS unit 31 from the electrical power source 17, and activates the GPS unit 31 (Step S13). In addition, the sub CPU 10*b* resets the fourth timer 18*d* to T4, and causes the fourth timer 18*d* to initiate measurement of T4 is initiated (Step S14).

Next, the sub CPU 10*b* conducts positioning of a current position by GPS positioning and acquires positional data representing the current position (Step S15). The positional data thus acquired is stored in association with an index number and current time data in the movement trajectory storage region 191 (Step S16).

When GPS positioning ends, the sub CPU 10*b* performs an inquiry of the main CPU 10*a* as to whether or not imaging (image capturing, i.e., image data acquisition by the imaging unit 20) has been performed. The sub CPU 10*b* determines whether or not image capturing has been performed based on the result of the inquiry (Step S17). In a case of having determined that imaging has been performed (Step S17: YES), the sub CPU 10*b* stores the positional data stored in Step S16 in the movement trajectory storage region 191, in association with the imaging timing flag (Step S18).

Next, the sub CPU 10*b* causes the processing to be in standby until the elapses of T4 is measured by the fourth timer 18*d*. In a case of having determined that T4 has elapsed and a timing of subsequent positioning and storing the positional data thus positioned has arrived (Step S19: YES), the sub CPU 10*b* determines whether or not the camera electrical power source remains ON (Step S20). In a case of having determined that the camera electrical power source remains ON (Step S20: YES), the sub CPU 10*b* causes the processing to return to Step S14.

On the other hand, in a case of having determined that the camera electrical power source has been turned OFF (Step S20: NO), the sub CPU 10*b* causes electrical power supply to the GPS unit 31 from the electrical power source 17 to be stopped, and causes the GPS unit 31 to enter a sleep state (Step S21). Next, the sub CPU 10*b* performs thinning so as to make the storage interval of positional data outside a predetermined time period before and after imaging, among the positional data stored in the movement trajectory storage region 191, become the interval T3 (Step S22). More specifically, the sub CPU 10*b* selects, from among the positional data stored in the movement trajectory storage region 191, positional data other than positional data acquired between t1 before and t2 after acquisition of positional data associated with the imaging timing flag. The sub CPU 10*b* leaves the positional data thus selected at each T3 interval, and deletes positional data other than this from the travel history storage region 191 so as to make a storage interval of the selected positional data T3. It should be noted that T1 and T2 maybe be the same, or may be different. The values of T1 and T2 can be set from the operation unit 15 by the user. After thinning, the sub CPU 10*b* writes the positional data stored in the movement trajectory storage region 191 in the external storage device 21 as movement trajectory data of the user. And the sub CPU 10b deletes positional data of the movement trajectory storage region 191 (Step S24). Then, the sub CPU 10b causes the processing to return to Step S1. The positioning processing A is repeatedly executed until the positioning electrical power source of the imaging device 1A is turned OFF.

FIGS. 4A and 4B are time charts showing relationships between ON/OFF states of the positioning electrical power source and camera electrical power source, the imaging timing, and the drive time period of GPS and the timing of GPS positioning and storage for a case of performing the above-mentioned positioning processing A.

As shown in FIG. 4A, in a case of the positioning electrical power source being ON and the camera electrical power source being OFF, the GPS unit 31 is activated at each activation interval T1, and is driven only in the drive time period T2. In this drive time period T2, the GPS unit 31 performs positioning by the GPS unit 31 at the T3 interval, and the positional data thus acquired is stored in the movement trajectory storage region 191. The solid arrows in FIG. 4A indicate the timing of positioning and storage.

As shown in FIG. 4B, when the camera electrical power source is turned ON, the sub CPU 10b activates the GPS unit 31, and supplies electrical power to the GPS unit 31 until the camera electrical power source is turned OFF. In the time period in which the electrical power is supplied to this GPS unit 31, positioning is performed by the GPS unit 31 at the interval T4 (T4<T3). The positional data thus acquired is stored in the movement trajectory storage region 191. The solid arrows and the dotted arrows in FIG. 4B indicate the timing of positioning and storage, respectively.

As shown in FIG. 4B, when the camera electrical power source is turned OFF, the sub CPU 10b temporarily interrupts the electrical power supply to the GPS unit 31. Then, the sub CPU 10b selects positional data, from among the positional data stored in the movement trajectory storage region 191, obtained outside a predetermined time period before and after imaging. The sub CPU 10b thins the positional data thus selected so as to make a storage interval thereof the T3 interval, and stores the remaining positional data in the external storage device 21. In FIG. 4B, the positional data acquired at the timings indicated by the dotted arrows is thinned. Then, the GPS unit 31 is activated by the sub CPU 10b again at each activation interval T1, and performs positioning at the interval T3 in the drive time period T2.

In this way, the CPU 10 of the imaging device 1A causes positioning to be performed by the GPS unit 31 while the camera electrical power source is ON in the positioning interval T4, which is shorter than the positioning interval T3 while the camera electrical power source is OFF. Then, the CPU 10 causes positioning information, from among the positional data acquired by the GPS unit 31 while the camera electrical power source is ON, acquired in a time period outside the t1 minutes before imaging to the t2 minutes after imaging (predetermined time before and after imaging) to be thinned and stored in the external storage device 21.

Therefore, for the time period in which the acquisition of a movement trajectory is not particularly important for the user, the CPU 10 can curb the positional data amount to be written to the external storage device 21 by making the positioning interval longer than the time for which the camera electrical power source is ON.

Also, for the time period in which the acquisition of a movement trajectory is not particularly important for the user, the CPU 10 can curb the positional data amount to be written to the external storage device 21 by thinning the positional data acquired, outside a predetermined time before and after imaging, even during the time for which the camera electrical power source is ON.

The CPU10 temporarily stores acquired positional data in the movement trajectory storage region 191 before the positional data is thinned. Therefore, the movement trajectory storage region 19 serves as a temporally storage unit for temporarily storing the positional data before being thinned and stored in the external storage device 21.

Furthermore, the CPU 10 can suppress the electrical power consumption of the imaging device 1A by curbing the positional data amount to be written.

In addition, the CPU 10 can shorten the time of writing positional data to the external storage device 21 by curbing the positional data amount to be written to the external storage device 21. On the other hand, in the predetermined time before and after imaging, since the movement trajectory of the user is stored in detail at a positioning interval, which is shorter than the time period outside this, it becomes possible for the user to know in detail a movement trajectory in the vicinity of a place at which imaging had been performed.

In addition, the positional data acquired in the time period outside the predetermined time before and after imaging when the camera electrical power source is ON, is thinned and stored in the external storage device 21, so that the storage interval thereof becomes the same as that of the positional data acquired and stored when the electrical power source is OFF. Accordingly, the storage interval of positional data can be made consistent for positional data obtained outside the predetermined time before and after imaging.

In addition, since the CPU 10 intermittently activates the GPS unit 31 while the camera electrical power source is OFF. As a result thereof, the CPU 10 can suppress electrical power consumption in comparison to a case of always driving the GPS unit 31.

The CPU 10 can overlay the positional data thus acquired with map data stored in the map database 22, and causes the display unit 16 to display a movement trajectory on a map based on the positional data thus overlaid with the map data. As a result thereof, the user can briefly know a movement trajectory during the period while the camera power source is OFF.

Furthermore, the user can also know the movement trajectory during the period while the camera power source is ON but imaging is not performed. In addition, the user can know a movement trajectory in detail in the vicinity of a place at which imaging had been performed.

[Second Embodiment]

Hereinafter, a second embodiment of the present invention is explained with reference to the drawings.

Figure 5:
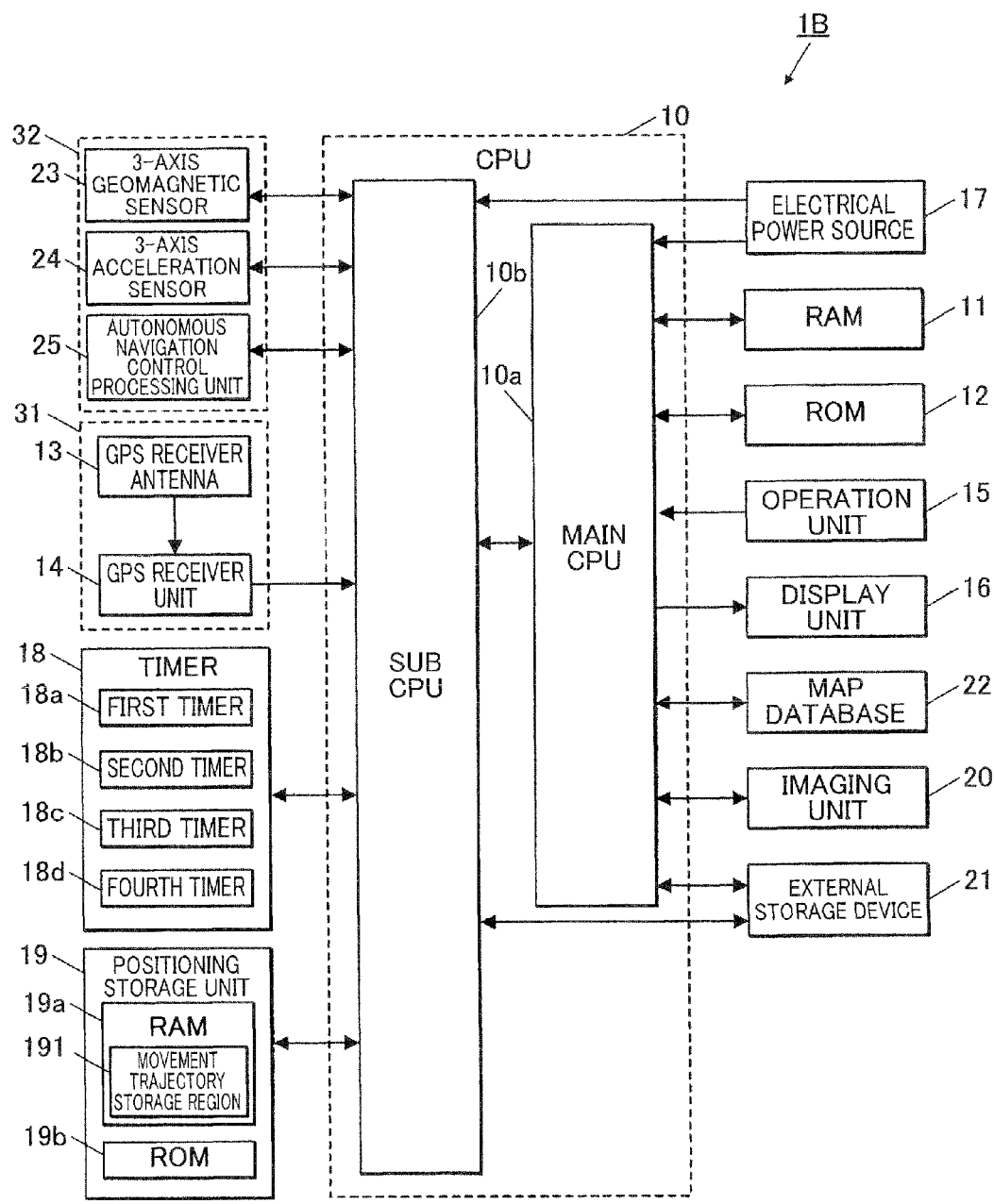
FIG. 5 is a block diagram showing a functional configuration of an imaging device according to a second embodiment.

FIG. 5 is a block diagram showing a functional configuration of an imaging device 1B as an information acquisition device according to the second embodiment.

The imaging device 1B is carried by a user, and has a positioning function of measuring the current position of the user. In addition to the GPS unit 31, the imaging device 1B includes an autonomous navigation unit 32 constituted by a three-axis geomagnetic sensor 23, a three-axis acceleration sensor 24, and an autonomous navigation control processing unit 25, as a positioning unit that detects the current position.

The three-axis geomagnetic sensor 23 is a sensor that detects the direction of geomagnetism. The three-axis acceleration sensor 24 is a sensor that respectively detects acceleration in the three axis directions and outputs a signal to the CPU 10. The autonomous navigation control processing unit 25 is dedicated hardware for assisting in the computing processing of the CPU 10. The autonomous navigation control processing unit 25 acquires measurement data of the three-axis geomagnetic sensor 23 and the three-axis acceleration sensor 24 in a predetermined sampling cycle via the sub CPU 10b. The autonomous navigation control processing unit 25 calculates the movement direction and movement amount of the imaging device 1B from this measurement data.

Furthermore, the autonomous navigation control processing unit 25 calculates the positional data of a visited place by adding, to the positional data of a reference place supplied from the sub CPU 10b, vector data composed of the above-mentioned movement direction and movement amount thus calculated. Then, the autonomous navigation control processing unit 25 obtains the positional data of the visited place, and supplies the positional data thus obtained to the sub CPU 10b.

In addition, in the second embodiment, the movement trajectory storage region 191 of the RAM 19a has a region for GPS that stores positional data output from the GPS receiver unit 25 and a region for autonomous navigation that stores positional data output from the autonomous navigation control processing unit 17. In addition to the index numbers "No." representing the acquisition order of the positional data, time data representing the time when positional data was acquired, an imaging timing flag indicating whether or not the positional data is acquired at the imaging timing, the region for autonomous navigation is constituted so that the index numbers of the region for GPS of positional data acquired at substantially the same time by way of GPS are stored in association with positional data, respectively. Due to being the same as that explained for the first embodiment, other constitutions of the imaging device 1B adopt the explanations thereof.

Next, positioning processing B that is executed in the sub CPU 10b of the imaging device 1B having the above-mentioned constitution will be explained. FIG. 6 is a flowchart showing the positioning processing B. The positioning processing B is initiated when the positioning electrical power source switch is turned ON, and is executed in cooperation with the sub CPU 10b and the programs stored in the ROM 19b. It should be noted that the processing of each step of Step S31 to Step S56 is executed at an extremely high speed, and does not particularly affect measurement of times T1, T2, T3 and T4.

In the positioning processing B, operating voltage is first supplied to the autonomous navigation unit 32 by the electrical power source 17, thereby activating the autonomous navigation unit 32 (Step S31).

Next, it is determined whether or not the camera electrical power source is ON (Step S32). When the camera electrical power source switch is turned ON, operating voltage is supplied to the main CPU 10a from the electrical power source 17. Communication between the main CPU 10a and the sub CPU 10b becomes possible. The sub CPU 10b determines whether or not the camera electrical power source is ON based on whether communication with the main CPU 10a is possible. It should be noted that, when the camera electrical power source is turned ON, operating voltage is supplied to each unit connected to the main CPU 10a including the imaging unit 20, and each unit is activated.

In Step S32, in a case of having determined that the camera electrical power source is not ON (Step S32: NO), the sub CPU 10b resets the first timer 18a to T1, and causes the first timer 18a to initiate measurement of T1 (Step S33). Next, the sub CPU 10b resets the second timer 18b to T2 and causes the second timer 18b to initiate measurement of T2 (Step S34). Next, the sub CPU 10b resets the third timer 18C to T3, and causes the third timer 18C to initiate measurement of T3 (Step S35).

Then, the sub CPU 10b determines whether or not elapse of T1 is measured by the first timer 18a (Step S36). In a case of having determined that elapse of T1 is not measured by the first timer 18a (Step S36: NO), the sub CPU 10b determines whether or not elapse of T2 is measured by the second timer 18b (Step S37).

In a case of having determined that elapse of T2 is not measured by the second timer 18b (Step S37: NO), the sub CPU 10b supplies electrical power to the GPS unit 31 from the electrical power source 17, and activates the GPS unit 31 (Step S38). Then, the sub CPU 10b outputs a command to instruct positioning to the GPS receiver unit 14, and causes to conduct the GPS positioning (Step S39). In other words, the sub CPU 10b causes the GPS receiver unit 14 to perform demodulation processing on signals received via the GPS receiver antenna 13. In this way, the sub CPU 10b acquires various transmitted data of GPS satellites, and causes to calculate positional data representing the current position by predetermined positioning computing based on the transmitted data thus acquired. The positional data thus acquired is stored in association with an index number and current time data in the movement trajectory storage region 191 of the RAM 19a (Step S40), and the processing advances to Step S42.

On the other hand, in a case of having determined that elapse of T2 is measured by the second timer 18b (Step S37: YES), the sub CPU 10b causes the electrical power source supply to the GPS unit 31 from the electrical power source 17 to be stopped. Then, the GPS unit 31 enters a sleep state (Step S41), and the processing advances to Step S42.

In Step S42, the sub CPU 10b outputs a command to instruct positioning to the autonomous navigation control processing unit 25, and causes the autonomous navigation control processing unit 25 to perform autonomous navigation positioning (Step S42). In other words, the autonomous navigation control processing unit 25 calculates the movement direction and movement amount of the imaging device 1B based on measurement data of the three-axis geomagnetic sensor 23 and the three-axis acceleration sensor 24 input from the sub CPU 10b. Furthermore, the autonomous navigation control processing unit 25 adds vector data composed of the above-mentioned movement direction and movement amount thus calculated to the positional data of a reference place supplied from the sub CPU 10b, thereby acquiring positional data representing the current position. The positional data thus acquired is output to the sub CPU 10b, and is stored, in the region for autonomous navigation of the movement trajectory storage region 191, in association with an index number, the current time data, and the index number associated with the positional data by GPS positioning stored in Step S40 (referred to as GPS index number) (Step S43).

Next, the sub CPU 10b causes the processing to be in a standby state until elapse of T3 is measured by the third timer 18c, and in a case of having determined that T3 has elapsed and a timing of subsequent positioning and storing positional data thereof has arrived (Step S44: YES), the sub CPU 10b determines whether or not the camera electrical power source is turned ON (Step S45).

In a case of having determined that the camera electrical power source has been turned ON (Step S45: YES), the sub CPU 10b causes the processing to advance to Step S46. In a case of having determined that the camera electrical power source has not been turned ON (Step S45: NO), the sub CPU 10b causes the processing to return to Step S35. In Step S36, in a case of having determined that T1 has elapsed since measurement by the first timer 18*a* was initiated (Step S36: YES), the sub CPU 10*b* causes the processing to return to Step S32.

In Step S32, in a case of having determined that the camera electrical power source is ON (Step S32: YES), the sub CPU 10*b* causes the processing to advance to Step S46.

In Step S46, the sub CPU 10*b* causes operating voltage to be supplied to the GPS unit 31 from the electrical power source 17, thereby activating the GPS unit 31 (Step S46). In addition, the sub CPU 10*b* resets the fourth timer 18*d* to T4, and causes the fourth timer 18*d* to initiate measurement of T4 (Step S47).

Next, the fourth timer 18*d* conducts GPS positioning on a current position, and acquires positional data representing the current position (Step S48). The positional data thus acquired is stored in association with an index number and current time data in the region for GPS of the movement trajectory storage region 191 (Step S49).

Then, the sub CPU 10*b* outputs a command to instruct positioning to the autonomous navigation control processing unit 25, and causes the autonomous navigation control processing unit 25 to execute autonomous navigation positioning (Step S50). The positional data thus acquired by autonomous navigation positioning is output to the sub CPU 10*b*. The positional data is stored in the region for autonomous navigation of the movement trajectory storage region 191, in association with an index number, current time data, and the GPS index number associated with the positional data by GPS positioning stored in Step S49.

When autonomous navigation ends, the sub CPU 10*b* performs an inquiry of the main CPU 10*a* as to whether or not imaging (image capturing, i.e., image data acquisition by the imaging unit 20) has been performed. The sub CPU 10*b* determines whether or not imaging has been performed based on the result of the inquiry (Step S52). In a case of having determined that imaging has been performed (Step S52: YES), the sub CPU 10*b* stores the positional data stored in Step S48 and Step S51 in the movement trajectory storage region 191, in association with the imaging timing flag (Step S53).

Next, the sub CPU 10*b* causes the processing to be in a standby state until the elapses of T4 is measured by the fourth timer 18*d*. In a case of having determined that T4 has elapsed and a timing of subsequent positioning and storing the positional data thus positioned has arrived (Step S54: YES), the sub CPU 10*b* determines whether or not the camera electrical power source remains ON (Step S55). In a case of having determined that the camera electrical power source remains ON (Step S55: YES), the sub CPU causes the processing return to Step S47.

On the other hand, in a case of having determined that the camera electrical power source has been turned OFF (Step S55: NO), the sub CPU causes electrical power supply to the GPS unit 31 from the electrical power source 17 to be stopped, and causes the GPS unit 31 to enter a sleep state (Step S56).

Next, the sub CPU 10*b* performs thinning so as to make the storage interval of positional data outside a predetermined time period before and after imaging, among the positional data respectively stored in the region for GPS and the region for autonomous navigation of the movement trajectory storage region 191, become the interval T3 (Step S57). More specifically, the sub CPU 10*b* selects, from among the positional data stored in the movement trajectory storage region 191, positional data other than positional data acquired between t1 before and t2 after acquisition of positional data associated with the imaging timing flag. The sub CPU 10*b* leaves the positional data thus selected at each T3 interval, and deletes positional data other than this from the travel history storage region 191 so as to make a storage interval of the selected positional data T3. After thinning, the sub CPU 10*b* writes the positional data stored in the movement trajectory storage region 191 in the external storage device 21 as movement trajectory data of the user. And the sub CPU 10*b* deletes positional data of the movement trajectory storage region 191 (Step S58). Then, the sub CPU 10*b* causes the processing to return to Step S32.

Herein, in a case of positional data by GPS positioning and positional data by autonomous navigation position being redundant, the sub CPU 10*b* stores the positional data by GPS positioning preferentially in the external storage device 21. The sub CPU 10*b* stores the corresponding positional data by way of autonomous navigation positioning in cases such as when positional data positioning could not be acquired by way of GPS or when the data is unreliable. The positioning processing B is repeatedly executed until the positioning electrical power source of the imaging device 1B is turned OFF, and ends when the positioning electrical power source is turned OFF.

FIGS. 7A and 7B are time charts showing relationships between the ON/OFF states of the positioning electrical power source and the camera electrical power source, the imaging timing, and the drive time period of GPS and a timing of GPS positioning and storage, the drive time period of autonomous navigation and a timing of positioning and storage for a case of having performed the above-mentioned positioning processing B.

As shown in FIG. 7A, in a case of the positioning electrical power source being ON and the camera electrical power source being OFF, the GPS unit 31 is activated at each activation interval T1, and is driven only in the drive time period T2. In this drive time period T2, the GPS unit 31 performs positioning at the interval T3, and stores the positioning data thus acquired in the region for GPS of the movement trajectory storage region 191.

In addition, the autonomous navigation unit 32 is always driven (electrical power supplied), performs positioning at the interval T3, and stores the positional data thus acquired in the region for autonomous navigation of the movement trajectory storage region 191.

The solid arrows in FIG. 7A indicate the timing of positioning and storage. As shown in FIG. 7B, when the camera electrical power source is turned ON, the sub CPU 10*b* activates the GPS unit 31, and supplies electrical power to the GPS unit 31 until the camera electrical power source is turned OFF. In this time period in which electrical power is supplied to the GPS unit 31, positioning is performed by the GPS unit 31 at the interval T4 (T4<T3). The positional data thus acquired is stored in the movement trajectory storage region 191.

In addition, the autonomous navigation unit 32 changes the positioning interval and the storage interval to the interval T4, and thus performs positioning at the interval T4. The solid arrows and dotted arrows in FIG. 7B indicate the timings of positioning and storage, respectively. When the camera electrical power source is turned OFF, as shown in FIG. 7B, the sub CPU 10*b* temporarily interrupts the electrical power supply to the GPS unit 31. Then, the sub CPU 10*b* selects positional data, from among the positional data stored in the region for GPS and region for autonomous navigation of the movement trajectory storage region 191, acquired in predetermined time period before and after imaging (a time period outside the t1 minutes before imaging to the t2 minutes after imaging). The sub CPU 10*b* thins the positional data thus selected so as to make a storage interval thereof the T3 interval, and stores the remaining positional data in the external storage device 21.

In FIG. 7B, the sub CPU 10b thins the positional data acquired at the timing indicated by dotted arrows. In a case of the positional data by GPS positioning and the positional data by autonomous navigation position being redundant, the sub CPU 10b stores the positional data by GPS positioning preferentially in the external storage device 21. Then, the sub CPU 10b activates the GPS unit 31 again at each activation interval T1, and performs positioning at the interval T3 in the drive time period T2. The autonomous navigation unit 32 performs positioning at the interval T3 also.

In this way, while the camera electrical power source is ON, the CPU 10 of the imaging device 1B causes the GPS unit 31 to perform positioning at the interval T4, which is shorter than the positioning interval T3 while the camera electrical power source is OFF. The sub CPU 10b causes the positional information acquired in a time period outside t1 minute before imaging to t2 minute after imaging (predetermined time before and after imaging), among the positional data acquired by the GPS unit 31 while the camera electrical power source is ON, to be thinned and stored in the external storage device 21. Therefore, for the time period in which the acquisition of a movement trajectory is not important for the user, the CPU 10 can curb the positional data amount to be written to the external storage device 21 by making the positioning interval longer than the time for which the camera electrical power source is ON.

The CPU 10 temporarily stores acquired positional data in the movement trajectory storage region 191 before the positional data is thinned. Therefore, the movement trajectory storage region 19 serves as a temporally storage unit for temporarily storing the positional data before being thinned and stored in the external storage device 21.

Also, for the time period in which the acquisition of a movement trajectory is not particularly important for the user, the CPU 10 can curb the positional data amount to be written to the external storage device 21 by thinning the positional data acquired, outside a predetermined time before and after imaging, even during the time for which the camera electrical power source is ON.

Furthermore, the CPU 10 can suppress the electrical power consumption of the imaging device 1B by curbing the positional data amount to be written. In addition, the time of writing positional data to the external storage device 21 can be shortened. On the other hand, in the predetermined time before and after imaging, since the movement trajectory of the user is stored in detail at a positioning interval, which is shorter than the time period while the camera power source if OFF, it becomes possible for the user to know in detail a movement trajectory in the vicinity of a place at which imaging had been performed.

In addition, the storage interval of positional data of the external storage device 21, for the positional data acquired in the time period outside the predetermined time before and after imaging when the camera electrical power source is ON, is thinned so as to be the same as the positional data acquired and stored when the electrical power source is OFF. Accordingly, the storage interval of positional data can be made consistent for positional data obtained outside the predetermined time before and after imaging.

Furthermore, since the imaging device 1B has a GPS unit 31 and an autonomous navigation unit 32 as positioning unit, and the autonomous navigation unit 32 is always made active, it is possible to acquire a movement trajectory at a predetermined interval even if the camera electrical power source is OFF. Since positional data acquired by the GPS unit 31 is preferentially written to the external storage device 21 as positional data when camera power source is ON, it is possible to store positional data having high accuracy for places in the vicinity of an imaging place that the user would like know in detail.

In addition, since the GPS unit 31 is intermittently made active while the camera electrical power source is OFF, it becomes possible to curb the electrical power consumption in comparison to a case of always driving the GPS unit 31.

The CPU 10 can overlay the positional data thus acquired with map data stored in the map database 22, and causes the display unit 16 to display a movement trajectory on a map based on the positional data thus overlaid with the map data.

As a result thereof, the user can briefly know a movement trajectory during the periods while the camera power source is OFF and while the camera power source is ON but imaging is not performed. In addition, the user can know a movement trajectory in detail in the vicinity of a place at which imaging had been performed.

In addition, the positional data acquired in the time period outside the predetermined time before and after imaging when the camera electrical power source is ON, is thinned and stored in the external storage device 21 so that the storage interval thereof becomes the same as that of the positional data acquired and stored when the electrical power source is OFF.

As a result thereof, since the storage intervals of positional data are made consistent for positional data obtained outside the predetermined time before and after imaging, a processing for displaying a movement trajectory on a display unit becomes simple, thereby enabling the display unit to promptly display the movement trajectory. For example, compressing processing can be executed easily, even in a case of compressing movement trajectory data so as to increase the storage interval, for example, by factor of two.

Although the first and second embodiments of the present invention have been explained in detail above, the descriptions of the above-mentioned first and second embodiments show preferred examples of the imaging device 1A and 1B according to the present invention, and the present invention is not to be limited thereto.

For example, although the above-mentioned first and second embodiments have explained a case of the information acquisition device of the present invention being an imaging device that acquires image information as an example, the present invention is not to be limited thereto. For example, the information acquisition device may be a voice recorder that acquires sound information, and stores, in detail in an external storage device, a movement trajectory of the user in the vicinity of a place at which audio recording has been performed.

In addition, although it has been described in the above-mentioned embodiments that positional data is stored in detail at a storage interval between t1 minute before imaging and t2 minute after imaging, the information acquisition device may be configured so as to store in detail only for a predetermined time period before imaging, or to store in detail only for a predetermined time period after imaging.

In addition, although the second embodiment shows an example in which the computing of autonomous navigation positioning is executed by the autonomous navigation control processing unit 25, the information acquisition device may be configured so that this computing is executed by software processing of the CPU 10.

Moreover, although the second embodiment exemplifies a three-axis geomagnetic sensor and a three-axis acceleration sensor as an autonomous navigation unit, a two-axis direction sensor or a two-axis acceleration sensor can be used so long as the orientation of the device to the earth is fixed.

Additionally, a gyroscope or the like can also be adopted in order to obtain a direction. Furthermore, the information acquisition device may be configured so as to obtain the rate of movement using a wheel speed sensor. In addition, although it has been described in the above-mentioned second embodiment that the positional data obtained by the movement positioning processing is defined as two-dimensional positional data, the information acquisition device may be configured so as to include positional data of the height direction.

Alternatively, it is also possible to appropriately modify the constitutional details and operational details of each device constituting the imaging devices 1A and 1B within a scope that does not deviate from the object of the present invention.

What is claimed is:

1. An information acquisition device, comprising:
   a positioning unit that measures a current position and acquires positional information thereof;
   an information acquisition unit that acquires information;
   a storage unit that stores information acquired by the information acquisition unit and positional information acquired by the positioning unit; and
   a control unit that (i) causes the positioning unit to sequentially perform positioning at a predetermined time interval, while the information acquisition unit is activated, (ii) causes a sequence of positional information which is acquired during the activation and in a predetermined time period to be stored in the storage unit without thinning, and (iii) causes positional information which is acquired during the activation and in another time period to be periodically thinned automatically such that only remaining positional information is stored in the storage unit;
   wherein the predetermined time period is defined with a time at which acquisition of information was performed by the information acquisition unit as a reference point, and the another time period is outside the predetermined time period; and
   wherein the control unit causes the positional information in the another time period to be stored in the storage unit, while the information acquisition unit is stopped, at a same time interval as an interval at which the positional information which has been thinned is to be stored in the storage unit.

2. The information acquisition device as set forth in claim 1, further comprising a temporary storage unit that temporarily stores the positional information acquired by the information acquisition unit before the positional information is stored in the storage unit,
   wherein the predetermined time period is a period including before and after the time at which the information was acquired, and the control unit causes the positional information to be thinned before the positional information is stored in the storage unit.

3. The information acquisition device as set forth in claim 1, wherein the positioning unit is a GPS unit that measures a current position by receiving signals from GPS satellites.

4. The information acquisition device as set forth in claim 1, wherein the positioning unit includes a GPS unit that measures a current position by receiving signals from GPS satellites and an autonomous navigation unit that measures a current position by autonomous navigation.

5. The information acquisition device as set forth in claim 4, wherein the control unit causes positional information acquired by the GPS unit to be preferentially stored in the storage unit as positional information while the information acquisition unit is activated.

6. The information acquisition device as set forth in claim 4, wherein the control unit causes the GPS unit to intermittently be activated while the information acquisition unit is stopped.

7. The information acquisition device as set forth in claim 1, wherein the information acquisition unit is an imaging unit.

8. A positional information storage method of an imaging device that includes a positioning unit that measures a current position and acquires positional information thereof, an information acquisition unit that acquires information, and a storage unit that stores information acquired by the information acquisition unit and positional information acquired by the positioning unit, the method comprising:
   causing the positioning unit to sequentially perform positioning at a predetermined time interval, while the information acquisition unit is activated;
   causing a sequence of positional information which is acquired during the activation and in a predetermined time period to be stored in the storage unit without thinning; and
   causing positional information which is acquired during the activation and in another time period to be periodically thinned automatically such that only remaining positional information is stored in the storage unit;
   wherein the predetermined time period is defined with a time at which acquisition of information was performed by the information acquisition unit as a reference point, and the another time period is outside the predetermined time period;
   wherein positional information is caused to be stored in the storage unit in the another time period, while the information acquisition unit is stopped, at a same time interval as an interval at which the positional information which has been thinned is to be stored in the storage unit.

9. A non-transitory computer readable storage medium having a program stored thereon which is executable by a computer of an information acquisition device that includes a positioning unit that measures a current position and acquires positional information thereof, an information acquisition unit that acquires information, and a storage unit that stores information acquired by the information acquisition unit and positional information acquired by the positioning unit, the program controlling the computer to function as:
   a control unit that (i) causes the positioning unit to sequentially perform positioning at a predetermined time interval, while the information acquisition unit is activated, (ii) causes a sequence of positional information which is acquired during the activation and in a predetermined time period to be stored in the storage unit without thinning, and (iii) causes positional information which is acquired during the activation and in another time period to be periodically thinned automatically such that only remaining positional information is stored in the storage unit;
   wherein the predetermined time period is defined with a time at which acquisition of information was performed by the information acquisition unit as a reference point, and the another time period is outside the predetermined time period;
   wherein the control unit causes the positional information in the another time period to be stored in the storage unit, while the information acquisition unit is stopped, at a same time interval as an interval at which the positional information which has been thinned is to be stored in the storage unit.

\* \* \* \* \*